United States Patent [19]
Leib et al.

[11] Patent Number: 5,205,993
[45] Date of Patent: Apr. 27, 1993

[54] CATALYTIC CRACKING APPARATUS USING CROSS-FLOW REGENERATOR

[75] Inventors: Tiberiu M. Leib, Voorhees; Ajit V. Sapre, W. Berlin, both of N.J.

[73] Assignee: Mobil Oil Corporation, Fairfax, Va.

[21] Appl. No.: 808,953

[22] Filed: Dec. 13, 1991

Related U.S. Application Data

[60] Continuation of Ser. No. 571,399, Aug. 23, 1990, which is a division of Ser. No. 431,953, Nov. 6, 1989, Pat. No. 4,980,048.

[51] Int. Cl.⁵ .............................. F27B 15/08; B01J 8/18
[52] U.S. Cl. ...................................... 422/144; 422/145; 431/7
[58] Field of Search ............... 422/144, 145; 110/245; 431/7; 122/40; 34/57 A

[56] References Cited

U.S. PATENT DOCUMENTS

| | | | |
|---|---|---|---|
| 2,096,609 | 10/1937 | Harper | 23/288 |
| 2,612,437 | 9/1952 | Kaulakis et al. | 422/145 X |
| 2,662,813 | 12/1953 | Packie | 422/144 |
| 2,701,193 | 2/1955 | Heudier et al. | 422/225 X |
| 2,815,268 | 12/1957 | Kaulakis | 422/145 |
| 2,881,132 | 4/1959 | Hengstebeck | 422/144 X |
| 2,913,392 | 11/1959 | Ricards | 422/144 X |
| 2,914,387 | 11/1959 | Borey | 422/145 |
| 2,948,671 | 8/1960 | Packie et al. | 422/144 X |
| 3,903,016 | 9/1975 | Owen | 422/144 X |
| 3,904,548 | 9/1975 | Fagan et al. | 252/417 |
| 3,958,353 | 5/1976 | Luckenback | 422/144 |
| 4,240,927 | 12/1980 | Karweil | 422/145 X |
| 4,559,719 | 12/1985 | Dodson | 422/195 X |

*Primary Examiner*—Robert J. Warden
*Assistant Examiner*—Amadia Santiago
*Attorney, Agent, or Firm*—Alexander J. McKillop; Malcolm D. Keen; Richard D. Stone

[57] ABSTRACT

An process and apparatus are disclosed for fluidized bed catalyst regeneration in a cross-flow type regenerator. A baffled coked catalyst inlet located within the dense bed of catalyst disperses and distributes coked catalyst flow in a direction generally normal to the direction of flow in the catalyst inlet. The baffle significantly reduces the stagnant regions in the bed.

2 Claims, 3 Drawing Sheets

CATALYTIC CRACKING APPARATUS USING CROSS-FLOW REGENERATOR

This application is a continuation of abandoned application Ser. No. 571,399 filed Aug. 23, 1990, which is a division of application Ser. No. 431,953 filed Nov. 6, 1989 and now U.S. Pat. No. 4,980,048 issued Dec. 25, 1990.

BACKGROUND OF THE INVENTION

1. Field of the Invention

The invention relates to the regeneration of fluidized catalytic cracking catalyst.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425 C.–600 C., usually 460 C.–560 C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500 C.–900 C., usually 600 C.–750 C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. The single dense bed usually flows in either a swirl pattern, or in a crossflow pattern. These units work, but at relatively low efficiency compared to more modern designs. The older units have had problems in establishing a desired gas flow through the bed, or were considered inefficient because they maintained the catalyst as a "bubbling" dense phase fluidized bed. Bubbling dense beds have never worked as well in large refinery units as they do in pilot plant size units. Much of the deficiency in operation was laid to the presence of large bubbles in the bed, which meant that the dense phase fluidized bed was not being efficiently used much of the time.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in most new units because it permits operation of an FCC with less catalyst inventor (and hence less catalyst loss), and because such units tend to have both less CO emissions and less NOx emissions than the single dense bed regenerators.

The high efficiency design uses a fast fluidized dense bed for coke combustion. These dense bed are intensely agitated, and large bubbles are not stable in such beds. The high efficiency regenerator design can achieve complete regeneration of catalyst with perhaps half the catalyst inventory required in the older regenerators, using a bubbling fluidized bed.

In FCC units, much of the catalyst is lost due to attrition, and an increase in catalyst inventory increases catalyst loss to attrition. Much of the activity loss of the FCC catalyst is due to steaming in the regenerator. This steaming is not intentional, but most regenerators operate with 5–10 psia steam partial pressure (due to entrained stripping steam, and water of combustion). Thus the regenerator is not only a regenerator, it is a catalyst steamer, and deactivator. Increased catalyst inventory in the regenerator leads to increased steaming and deactivation of the FCC catalyst.

There is therefore a great incentive to do everything possible to reduce the catalyst inventory of a regenerator, and to improve the efficiency of the regenerator. That is why a majority of new FCC construction uses the high efficiency regenerator design.

Unfortunately, it has not been economically justifiable to convert older style, single dense bed regenerators to the modern H.E.R. design because of the high capital cost associated with simple scrapping of the old single bed regenerator. Attempts to simply use the old single stage regenerator as part of a modern two stage, H.E.R. design have not been too successful, as the old single stage units are much larger than either of the beds in an H.E.R. unit. Another complication has been that many of the older units were not designed to operate at the higher temperatures associated with complete CO combustion.

Rather than scrap older FCC regenerators, refiners have tried to improve them, and the FCC process, as much as possible with improvements in catalyst and catalyst additives.

Actually, refiners have known for many years that there were problems with bubbling bed regenerators. Problems exist in both cross-flow regenerators and in swirl type regenerators, however more has been published on problems in swirl units, so these will be reviewed first.

A typical swirl type regenerator is shown in U.S. Pat. No. 3,817,280, which is incorporated herein by reference.

The swirl type regenerator adds spent catalyst to an FCC regenerator having a generally circular cross section. The catalyst is added via a single inlet, to the dense bed of catalyst in the regenerator in a tangential direction, imparting a swirling motion to the dense bed. The catalyst swirls around roughly ¾ of the regenerator, and then is withdrawn as regenerated catalyst for reuse in the FCC process.

The swirl regenerator is an elegant concept which causes problems in practical operation. The spent catalyst, laden with coke and poorly stripped hydrocarbons, is added to one portion of the bed. The catalyst removed after one radial traverse of the bed has essentially no unstripped hydrocarbons, and a very low level of residual coke or carbon on catalyst. For efficient operation, the amount of regeneration gas added should roughly equal the amount of combustible substance to be burned, and this means that very large amounts of combustion air are needed where spent catalyst is added, and almost no combustion air is needed where catalyst is withdrawn.

FCC operators have provided means for improving the distribution of combustion air to such regenerators. In U.S. Pat. No. 3,817,280, a better way of controlling the distribution of combustion air was provided. The air distribution grid beneath the bubbling dense bed was radially segmented, and means were provided for adjusting the flow of combustion air to each radial segment. In this way it was possible to fine tune the amount of air added to different radial segments of the bubbling fluidized bed.

The approach of U.S. Pat. No. 3,817,280 provided a better way to distribute the air to a swirl type regenerator. It ignored the problem of inefficiencies regards the distribution of solids to a swirl type regenerator.

U.S. Pat. No. 3,904,548, which is incorporated herein by reference, recognized the problem of efficient operation of a large size, fluidized bed, swirl type regenerator. A baffle was provided, adjacent the tangential catalyst inlet, to mix some regenerated catalyst with incoming stripped catalyst. The baffle provided an expanding annulus of about 20 degrees in the direction of catalyst flow, to prevent undesired catalyst circulation.

The operation of swirl, cross-flow, and other types of regenerators was significantly improved by the use of CO combustion promoters, discussed hereafter.

U.S. Pat. Nos. 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory. Such combustion promoters improve the rate of CO burning in all types of regenerators, both modern and old. CO combustion promoters help minimize CO emissions, but can cause an increase in the amount of nitrogen oxides (NOx) in the regenerator flue gas. It is difficult in a catalyst regenerator to completely burn coke and CO in the regenerator without increasing the NOx content of the regenerator flue gas. Swirl type regenerators are especially troublesome in this regard, i.e., enough excess air and CO combustion promoter can be added to meet CO limits, but this will greatly increase NOx emissions Cross-flow regenerators have similar problems.

We realized that there was a problem with the basic design of the cross-flow regenerator used in many commercial FCC units. The problem was not so much with air distribution, but rather with stagnant regions in the bubbling bed. We studied cross-flow type regenerators, and found that in many units 50% or more of the dense bed of catalyst was relatively stagnant.

We discovered a way to overcome many of the deficiencies of catalyst distribution in cross-flow type regenerators by making changes in the way that catalyst was distributed after it was added to the dense bed. We found a way to retain the single spent catalyst inlet used in these unit, and distribute this catalyst internally, after addition of catalyst to the dense phase fluidized bed, to reduce greatly the stagnant areas of the dense bed. We found a way to do this without altering the catalyst withdrawal sink.

BRIEF SUMMARY OF THE INVENTION

Accordingly, the present invention provides a process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a cross-flow type regenerator which maintains a dense phase, bubbling fluidized bed of catalyst having a depth of at least 8 feet within a regenerator vessel having a diameter of at least 8 feet, and wherein at least 35% of said dense bed is relatively stagnant and said coked cracking catalyst is added via a single coked catalyst inlet having an inlet diameter of at least 1 foot and connective with one side of said regenerator, said inlet discharging said coked catalyst into said dense bed, and said coked catalyst is regenerated in said dense bed by contact with an upflowing supply of oxygen or an oxygen containing gas to produce regenerated catalyst which is withdrawn from said catalyst bed via a catalyst outlet located in a lower portion of said dense bed, said outlet being on the other side of said dense bed relative to said inlet whereby there is a general cross-flow of coked catalyst from the inlet to the regenerated catalyst outlet, characterized by providing a baffle within said regenerator dense bed which is operatively associated with said catalyst inlet to disperse and distribute incoming spent catalyst into at least two streams of spent catalyst within said dense bed and to reduce the amount of said dense bed which is stagnant, said baffle having a baffle diameter, as measured on a plane normal to said coked catalyst inlet, at least equal to the diameter of said coked catalyst inlet; a baffle height of at least 8 feet; and wherein said baffle is spaced inwardly from an outer wall of said regenerator by a distance at least equal to the diameter of said catalyst inlet.

In an apparatus embodiment, the present invention provides an apparatus for the fluidized catalytic cracking (FCC) of a hydrocarbon by contact of a crackable hydrocarbon with with a source of regenerated FCC catalyst in a cracking reactor means to produce catalytically cracked products and coked FCC catalyst which is regenerated in a cross-flow type regenerator means to produce regenerated catalyst which is recycled to said cracking reactor means, characterized by a baffled cross-flow type regenerator means comprising in operative combination: a regenerator vessel having a diameter of at least 8 feet, and adapted to maintain a dense phase, bubbling fluidized bed of catalyst having a depth of at least 8 feet; a coked FCC catalyst inlet comprising a single catalyst inlet having an inlet diameter of at least 1 foot and connective with a side of said regenerator a regeneration gas inlet connective with an air distribution means in a lower portion of said regenerator vessel; a flue gas outlet means in an upper portion of said regenerator vessel for removal of flue gas: a non-centrally located regenerated catalyst outlet located in a lower portion of said dense bed and near a side of said regenerator vessel, said outlet being on the other side of said dense bed relative to said spent catalyst inlet whereby there is a general cross-flow of coked catalyst from said coked FCC catalyst inlet to the regenerated catalyst outlet: and a baffle within said regenerator dense bed which is operatively associated with said catalyst inlet to disperse and distribute incoming spent catalyst into at least two streams of spent catalyst within said dense bed, said baffle having a baffle diameter, as measured on a plane normal to said coked catalyst inlet, at least equal to the diameter of said coked catalyst inlet; a baffle height of at least 8 feet; and wherein said baffle is spaced inwardly from an outer wall of said regenerator by a distance at least equal to 50% of the diameter of said catalyst inlet.

DETAILED DESCRIPTION

The invention can be better understood with reference to the drawings, and a discussion of the prior art cross-flow type regenerator.

Figure 1:
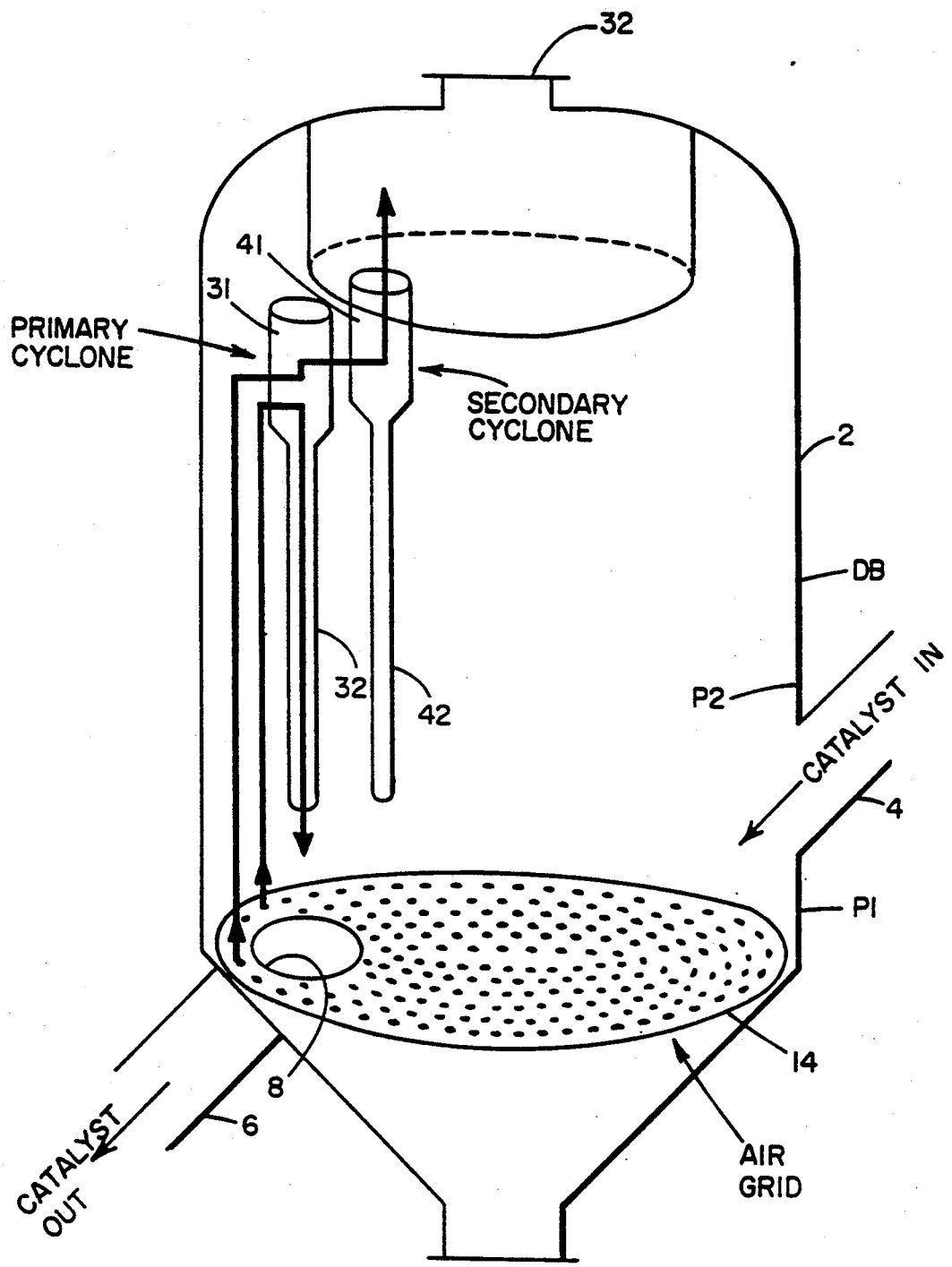
FIG. 1 (prior art) is a simplified, cross-sectional view of a cross-flow type regenerator FIG. 2 (prior art) is a cross sectional view of the regenerator of FIG. 1, showing the catalyst flow across the regenerator.

FIG. 1 (prior art) is a simplified, cross-sectional view of a cross-flow type regenerator which is typical of many in commercial use.

Spent catalyst in line 4 is discharged down into regenerator 2. Air passes up into the regenerator via air grid 14, and fluidizes and regenerates the catalyst, which is maintained as a bubbling fluidized dense phase bed.

Catalyst flows across the regenerator, and is removed via sink 8 which is in the base of the air grid 14, and is therefore on the bottom of the bubbling fluidized bed of catalyst.

Flue gas and entrained catalyst rise above the bubbling bed, pass through primary cyclone 31 and secondary cyclone 41. Catalyst is recycled to the dense bed via diplegs 32 and 42, while flue gas is discharged via outlet 32.

Figure 2:
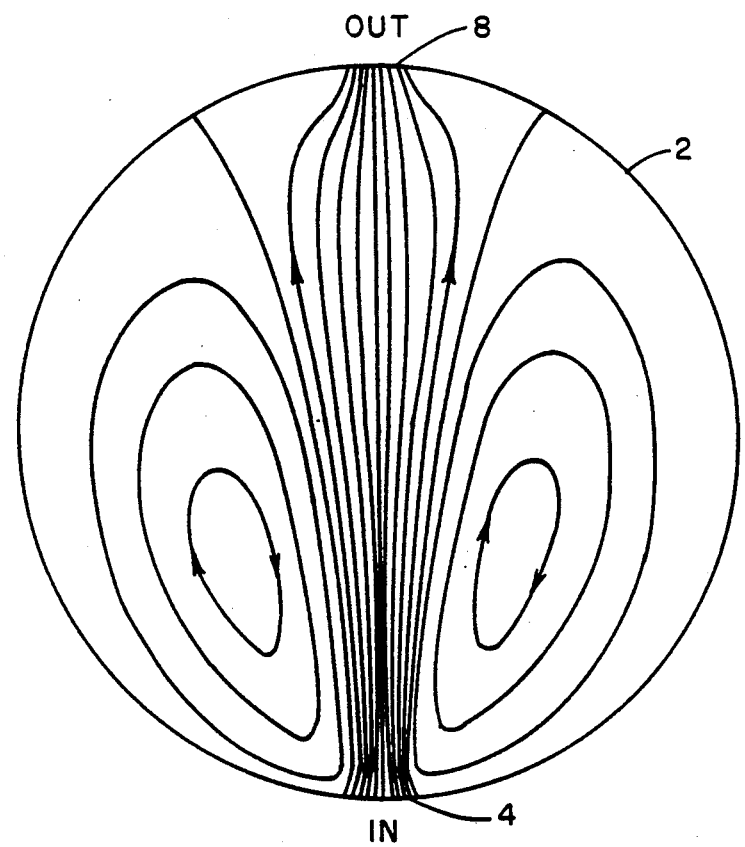

FIG. 2 shows a typical flow pattern in a cross-flow regenerator such as that shown in FIG. 1. Much of the spent catalyst tunnels through the dense bed to catalyst sink 8. Much of the dense bed is relatively inactive.

Figure 3:
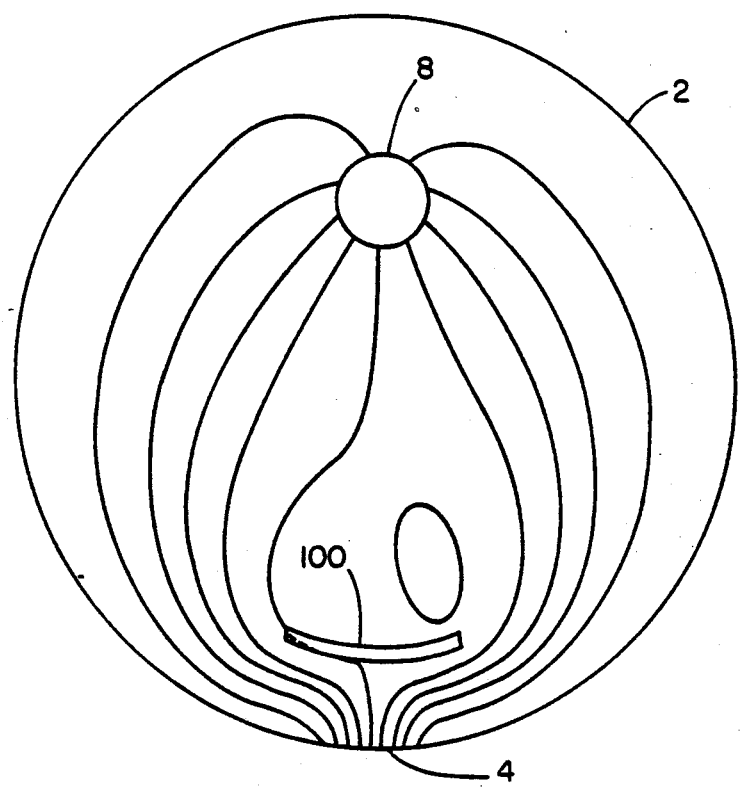
FIG. 3 is a simplified, cross sectional view of an improved regenerator of the present invention, with a baffled catalyst inlet.

FIG. 3 shows one preferred embodiment of the present invention, a cross-flow type regenerator with a baffled catalyst inlet.

FIG. 3 is closely patterned after FIG. 2, and elements 2, 4 and 8 are the same in each figure. The baffle 100 is essentially the only change between FIG. 2 and FIG. 3, but there is a profound change in the flow patterns, and size of the stagnant regions in the dense bed.

Baffle 100 splits and distributes the incoming spent catalyst, and even mixes the incoming spent catalyst to a certain extent with the regenerated catalyst already in the dense bed. The flow patterns are much improved, as is evident from a comparison of FIG. 3 to FIG. 2.

Figure 4:
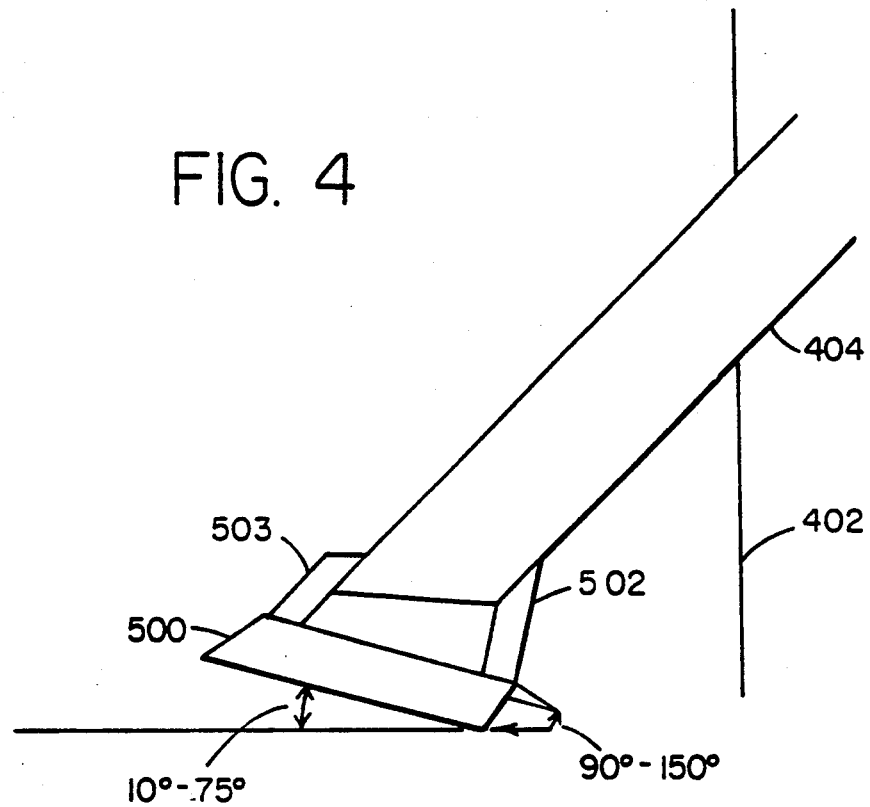
FIG. 4 is a simplified, schematic view of an improved regenerator of the present invention, with a baffle mounted on, and supported by, the coked catalyst inlet.
Figure 4A:
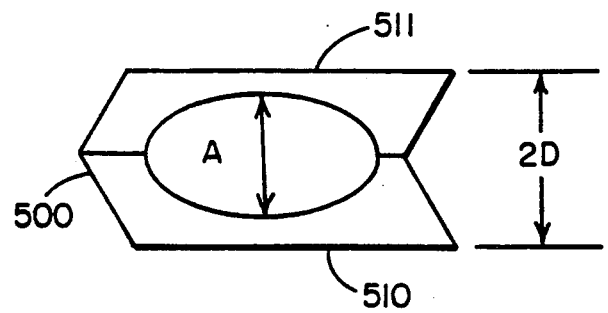
FIG. 4A is an elevation view of the FIG. 4 baffle.

FIG. 4 shows a baffle supported by the coked catalyst inlet 404 which extends well into the regenerator vessel through vessel walls 402. The baffle 500 is displaced from, and affixed to, the coked catalyst inlet pipe 404 via support means 502 and 503. The baffle 500 shown is made up of two rectangular plates 510 and 511. Baffle 500 may also have any other suitable shape which will split or deflect catalyst flow, such as a square, rectangle or circle comprising a single plate. The baffle may even deflect catalyst flow back toward the catalyst inlet, much as thrust reversers on a jet engine can be used to reverse the direction of flow of a fluid.

The diameter A of the coked catalyst inlet is shown superimposed on the baffle 500, which preferably has a dimension, as measured normal to catalyst flow in pipe 404, of 2A.

The baffle 500 can be at any desired angle relative to the catalyst inlet pipe 404. Baffle 500 can be generally vertical, i.e. parallel to vessel wall 402, in which case it will behave very much like a vertical baffle affixed to the air grid. Baffle 500 can be generally horizontal, i.e., parallel to the air grid and normal to the wall 402 of the regenerator vessel. The precise angle chosen depends to some extent on the penetration of pipe 404 into vessel 402, and on the angle at which coked catalyst is discharged from pipe 404. In most FCC regenerators the catalyst will be discharged down into the regenerator vessel, usually at an angle from the horizon (or the surface of the dense bed of catalyst) ranging from 30 to 50 degrees, and preferably at an angle ranging from 35 to 45 degrees, roughly as shown in the Figure. For these units, it will be best to use a baffle which is as shown in the Figure, i.e., one having an angle from the horizontal of 10 to 75 degrees. The baffle should be made of two rectangular plates affixed to define an angle of 90 to 150 degrees. The embodiment shown in FIG. 4 allows a significant amount, roughly 20% of the coked catalyst entering the regenerator vessel, to bypass the baffle, and flow more or less directly into the catalyst dense bed, over baffle 500.

EXPERIMENTS—COMPUTER SIMULATIONS

Extensive experimental work studying commercial and laboratory size fluidized bed, and further work on developing a computer program which allowed us to accurately model the behavior of large, commercial FCC regenerators.

As a result of our study, we discovered that the conventional cross-flow type regenerator, such as that disclosed in FIG. 1 and FIG. 2, leaves 65% of the dense phase, bubbling fluidized bed of catalyst relatively stagnant. We define a stagnant region as one where the predicted streamlines form a closed loop, i.e., the net flow of catalyst from inlet to outlet is outside the boundaries of this loop. The catalyst within the loop, or stagnant region, can be well fluidized, but it is not going anywhere. Thus as used herein, stagnant refers more to active chemical reactions taking place, or efficient coke burning within a region, rather than the more classical concept of stagnant regions, where there is no flow at all.

We tried to improve this design using multiple inlets. Although some improvement was noted, there was not enough improvement to justify the capital cost of splitting the spent catalyst into two or more streams. It costs a lot to split the catalyst flow into two streams because the catalyst flows are so large (on the order of 2000 to 4000 tons per hour of catalyst). To achieve a good, uniform division of catalyst the piping used must be mirror image symmetrical or something close to this. Valves can be used to control catalyst flow, but because of the large size of the catalyst flows being contemplated, and the high temperatures, around 1000 F., it usually will not be cost effective to use valves to assure a 50/50 split of catalyst.

We tried moving the regenerated catalyst withdrawal point from its old location to a central location, and adding catalyst from 2 or more symmetrical locations. Again, some improvement was noted, but not enough to justify the substantial costs of splitting the catalyst inlet line and the further substantial costs of moving the catalyst outlet line. The catalyst outlet line is expensive to move because of the size of this line, typically 5 to 8 feet in diameter. There are also substantial costs associated with cutting into the regenerator vessel at a new place to accommodate the new outlet line, and plugging of the old outlet.

We were aware of the use of baffles to improve operation of swirl flow type regenerators. We studied the operation of a swirl type regenerator, and found that the use of anti-bypass baffles either made little improvement, or actually made things worse regards stagnant regions of the bed. Despite the discouraging results with baffles in swirl type regenerators, we persisted in studying the use of baffles in cross-flow type regenerators.

The breakthrough came when we used a baffle in a cross-flow type regenerator located within the catalyst dense bed to, in effect, split the spent catalyst addition in two. By using an inlet baffle in a cross flow regenerator, we were able to significantly increase the active area, or non-stagnant area, of the bed.

The results of the computer simulation are reported below in the table. Simulation 1 represents a conventional, prior art, cross flow regenerator design.

|   | INLET | OUTLET | STAGNANT REGION, % |
|---|---|---|---|
| 1 | ONE | ONE @ SIDE | 65% |
| 2 | 2 SYMMETRICAL | CENTER | 60% |
| 3 | 4 SYMMETRICAL | CENTER | 50% |
| 4 | 2, 40 degrees | ONE @ SIDE | 40 |
| 5 | BAFFLE | ONE @ SIDE | 30 |
| 6 | 80% BAFFLE | ONE @ SIDE | 8 |

2 symmetrical inlets means that there were two tangential inlets 180 degrees apart from one another. In the case of 4 symmetrical inlets, they were spaced 90 degrees apart.

2 inlets spaced 40 degrees apart, with a single, central catalyst outlet gave better results, but at a significant capital expense.

In simulation 5, with a baffle having the configuration similar to that of FIG. 3, the active or non stagnant area of the catalyst bed was doubled, from 35% active to 70% active. This was accomplished with no modifications to the spent catalyst inlet or the regenerated catalyst outlet. Surprisingly, a single spent catalyst inlet, with the baffle of the present invention, gave better results than splitting the catalyst flow between two nozzles, and moving the catalyst sink to the center of the regenerator.

In simulation 6, the baffle design allows 20% of the catalyst from the catalyst inlet to bypass the baffle, while 80% is baffled, i.e., split into two streams which are deflected or diverted roughly sideways. This could be accomplished using the FIG. 4 design, or one of the other designs could be modified by providing one or more holes or slits in the baffle to allow 20% of the catalyst to "leak" through the baffle.

The approximate dimensions of a typical cross flow regenerator, associated with a typical 20,000 BPD cracking unit are as follows. The overall ID of the regenerator vessel is about 16 feet. The catalyst flow is 1200 tons/hr into the regenerator. The catalyst is added via one normal inlet pipe having an ID of 18 inches. The catalyst velocity as it leaves the inlet is about 5 feet per second. It is discharged at an angle (40 degrees) as shown in FIG. 1 into a dense phase fluidized bed of catalyst having a depth of about 12 to 20 feet. The catalyst sink, or bathtub, has an ID of about 5 feet for withdrawal of catalyst. The sink is at the opposite side of the regenerator from the catalyst inlet.

Many cross-flow regenerators are somewhat larger than this. The regenerator associated with a 50–60,000 BPD unit will have a catalyst inventory of around 200 tons and will be much larger than the smaller unit described above. The regenerator diameter will be about 30 to 36 feet, and the catalyst inlet line will have an ID of about 3 feet. The catalyst velocity in the inlet line will still be about the same, e.g, about 6 fps. The catalyst flow in such a unit will be 3600 tons per hour into the regenerator. The dense phase fluidized bed of catalyst will have a depth of 10–15 feet. The catalyst sink or bathtub will have an ID of about 7 or 8 feet.

The conditions in the regenerator re. air flow, temperature, catalyst type, are all conventional. The invention has nothing to do with a new catalyst, it is directed solely to reducing the stagnant regions in existing cross-flow type regenerators to improve their operation.

BAFFLE DESIGN

The baffle should have a width equal to 100 to 400% of the width of the catalyst inlet. The baffle should extend from the base of the dense bed, i.e., from the top of the air grid, to the base of the catalyst inlet line, and preferably to the top of the catalyst inlet line, and most preferably to the top of the catalyst dense bed.

The baffle preferably is placed normal to the flow of incoming catalyst, but satisfactory operation may be achieved with a generally vertical baffle.

The baffle may be a flat plate, but preferably is bent or curved to conform to the walls of the catalyst regenerator. Other shapes, such as a plow, hemisphere, cone, and the like may be used, but not necessarily with equivalent results. The essential feature of a satisfactory baffle is that it will divert a majority of the incoming catalyst to one or the other side of the cross flow type regenerator. Splitting catalyst flow in two, and diverting catalyst at right angles from the direction of flow into the cross flow regenerator is preferred, but some lesser diversion, e.g., diverting catalyst only 45 to 85 degrees from the direction of catalyst flow into the regenerator will still bring about a considerable improvement in regenerator operation. Use of a poorly sealed baffle, that allows some flow of catalyst over or under the baffle will not seriously impair operation, so long as a majority of the incoming catalyst is diverted sideways. Use of a poorly sealed baffle, or a baffle with holes or slots cut in, or two baffles which are relatively close together, with a relatively small opening in between, may actually improve operation some, in reducing the stagnant area on the other side of the baffle, across from the catalyst inlet. This fine tuning of baffle design is beneficial, but may require an inordinate amount of site specific testing. Testing of the baffle shape in a regenerator model, or testing in a computer simulator, may be used to confirm if a desired baffle shape and size will give satisfactory results. Usually the cost of exotic shapes will not be justified by the results achieved in use, and the concerns over having a baffle which will operate without failure for at least a year and preferably for two or three years make clean, simple baffle designs preferable.

We found that even further improvements could be made by using an imperfect baffle. Our computer simulation shows that when we use a baffle which allows significant amounts of the catalyst flow to "leak" or pass through the baffle, the stagnant zone behind the baffle is greatly reduced, and can even be eliminated. This allows the residual stagnant regions to be greatly reduced or eliminated. A baffle which allows 20% of the catalyst inlet to pass through the baffle reduces the stagnant region of the dense phase bubbling bed to less than 10%. Although this is a significant improvement, the use of a perforated baffle, or a baffle with a large hole in the center, or one which is tilted or notched so that it allows 10-30% of the catalyst to pass unbaffled, introduces concerns about mechanical reliability. Rather than use the best design, in regards to reducing stagnant regions, it may be better overall to use a design which is simpler, and will last longer.

The baffle will give better results when it is radially displaced from the catalyst inlet The optimum spacing depends somewhat on baffle size and shape, and somewhat on the velocity of the spent catalyst entering the regenerator. For a regenerator of 16 feet diameter, with a 16 foot deep dense phase fluidized bed, the optimum spacing of the baffle from the regenerator wall 2 is about two feet, when the velocity of catalyst in the spent catalyst transfer line 4 is about 5 feet/second. When the catalyst velocity is higher, it is better to provide a greater distance between the baffle and the wall of the regenerator. For a 10 fps spent catalyst velocity, and this is believed to be about the highest velocity that would normally be encountered, a spacing of about 3 feet from the wall would give better results. The optimum shape of the baffle in either case, whether 2' or 3' from the wall, would be a curved, vertical wall defining part of a circle having as its center the center of the regenerator.

Expressed in more generalized terms, the baffle should have a width equal to 1 to 4 times the width of the catalyst inlet, preferably from 1.5 to 3 times the width of the catalyst inlet, and most preferably from 1.75 to 2.5 times the width of the catalyst inlet.

The baffle should be spaced from the catalyst inlet by a distance equal to 0.75 to 5 times the width of the catalyst inlet, preferably from 0.8 to 4 times the width of the catalyst inlet, and most preferably from 1 to 2 times the width of the catalyst inlet.

The baffle should be parallel to, or curved slightly inward from, the walls of the catalyst regenerator 2.

Rather than attach and anchor the baffle to the air grid or some other part of the base of the regenerator vessel, it is also possible to attach the baffle to the coked catalyst inlet, or to the wall of the regenerator. In a preferred embodiment, the baffle comprises a cone, wedge or plow shaped "hat" which is attached to an extension of the catalyst inlet, or attached to the wall of the regenerator vessel near to the catalyst inlet. FIGS. 4 shows a wedge shaped "hat", something like a "coolie hat". This design can achieve bypassing, if desired, by allowing catalyst to overflow or underflow the baffle, or the hat may contain a relatively simple, elliptical or circular opening. The wedge portions split the incoming catalyst flow into two streams which are diverted to the right and left sides of the catalyst inlet stream. The opening allows a desired portion to bypass the baffle, and reduce or eliminate the stagnant area that would be created by a large baffle sealed to the regenerator air grid.

Other mechanical means may also be used to split the catalyst flow at least into two streams after admission of the coked catalyst to the regenerator. A long catalyst inlet line extending well into the regenerator, with a plugged end and slit sides, can functionally accomplish the same thing as the preferred baffle arrangement. Conventional fluidic control devices can be used to split and direct coked catalyst. High pressure streams of air or inert gas can be used to split incoming catalyst flow. Mechanical driven stirrers or paddles can be used to divert slugs of coked catalyst alternatively from one side of the regenerator vessel to the other side. The cost and complexity of such mechanical approaches, and the need for the baffle to survive for years in an environment that resembles a sandblasting machine more than anything else, will usually make the simple approaches better in practice.

The process and apparatus of the present invention will improve catalyst flow in the dense bed of a cross-flow type regenerator and increase the carbon burning capacity of the regenerator, allowing the regenerator to produce catalyst with lower residual carbon levels, or alternatively to increase catalyst throughputs. The better operation of the dense bed will greatly simplify the design and operation of the air grid used to add combustion air. Because of more uniform bed operation, and more efficient use of combustion air, there will be a reduction in CO emissions, and a reduction in NOx emissions that would otherwise be associated with localized high concentrations of air due to stagnant regions in the prior art design.

We claim:

1. A cross-flow FCC catalyst regeneration apparatus for the fluidized catalytic cracking of hydrocarbons by contact with a source of regenerated fluidized catalytic cracking (FCC) catalyst to produce catalytically cracked products and spent catalyst, and for the regeneration of coked FCC catalyst, comprising:

a regenerator vessel defined by a cylindrical sidewall and a diameter of at least 8 feet for maintaining a dense phase, bubbling fluidized bed of catalyst having a depth of at least 8 feet;

a single catalyst inlet and a single catalyst outlet, wherein said catalyst inlet is defined by a downwardly connected coked FCC catalyst inlet normal to the sidewall having an inlet diameter of at least 1 foot and connective with the sidewall of said regenerator for discharging coked catalyst downward at a 40 degree angle into said regenerator vessel;

a regeneration gas inlet connective with an air distribution means in a lower portion of said regenerator vessel;

a flue gas outlet means in an upper portion of said regenerator vessel for removal of flue gas;

said catalyst outlet consisting essentially of a single non-centrally located regenerated catalyst outlet located in a lower portion of said baffled regenerator vessel at the opposite side of the regenerator vessel from the catalyst inlet;

a baffle comprising a matched pair of rectangular plates symmetrically connected at an edge thereof to form an angle of 90 to 150 degrees, and wherein said baffle is inclined at an angle from about 10 to 75 degrees to horizontal and spaced inwardly inside said vessel from said catalyst inlet by a distance at least equal to 50% of the diameter of said coked catalyst inlet and having a baffle width, as measured on a plane normal to said coked catalyst at least equal to the diameter of said coked catalyst inlet and wherein said baffle has a surface area and contains holes or slits equal to 10-30% of the baffle area.

2. A cross-flow FCC catalyst regeneration apparatus for the fluidized catalytic cracking of hydrocarbons by contact with a source of regenerated fluidized catalytic cracking (FCC) catalyst to produce catalytically cracked products and spent catalyst, and for the regeneration of coked FCC catalyst, comprising:

a regenerator vessel defined by a cylindrical sidewall with a diameter of at least 8 feet for maintaining a dense phase, bubbling fluidized bed of catalyst having a depth of at least 8 feet;

a single catalyst inlet and a single catalyst outlet, wherein said catalyst inlet is defined by a downwardly connected coked FCC catalyst inlet normal to the sidewall, having an inlet diameter of at least 1 foot and connective with the sidewall of said regenerator for discharging coked catalyst into said regenerator vessel;

a regeneration gas inlet connective with an air distribution means in a lower portion of said regenerator vessel;

a flue gas outlet means in an upper portion of said regenerator vessel for removal of flue gas;

said catalyst outlet consisting essentially of a single non-centrally located regenerated catalyst outlet located in a lower portion of said regenerator vessel at the opposite side of the regenerator vessel from the catalyst inlet;

a baffle having a baffle area disposed normal to the coked catalyst inlet, and spaced inwardly inside said vessel from said catalyst inlet by a distance at least equal to 50% of the diameter of said coked catalyst inlet and having a baffle width, as measured on a plane normal to said coked catalyst inlet, at least equal to the diameter of said coked catalyst inlet and containing holes or slits equal to 10–30% of the baffle area.

* * * * *